Feb. 8, 1944. J. G. INGRES 2,341,324
AIRPLANE PICKUP MECHANISM
Filed Aug. 18, 1941
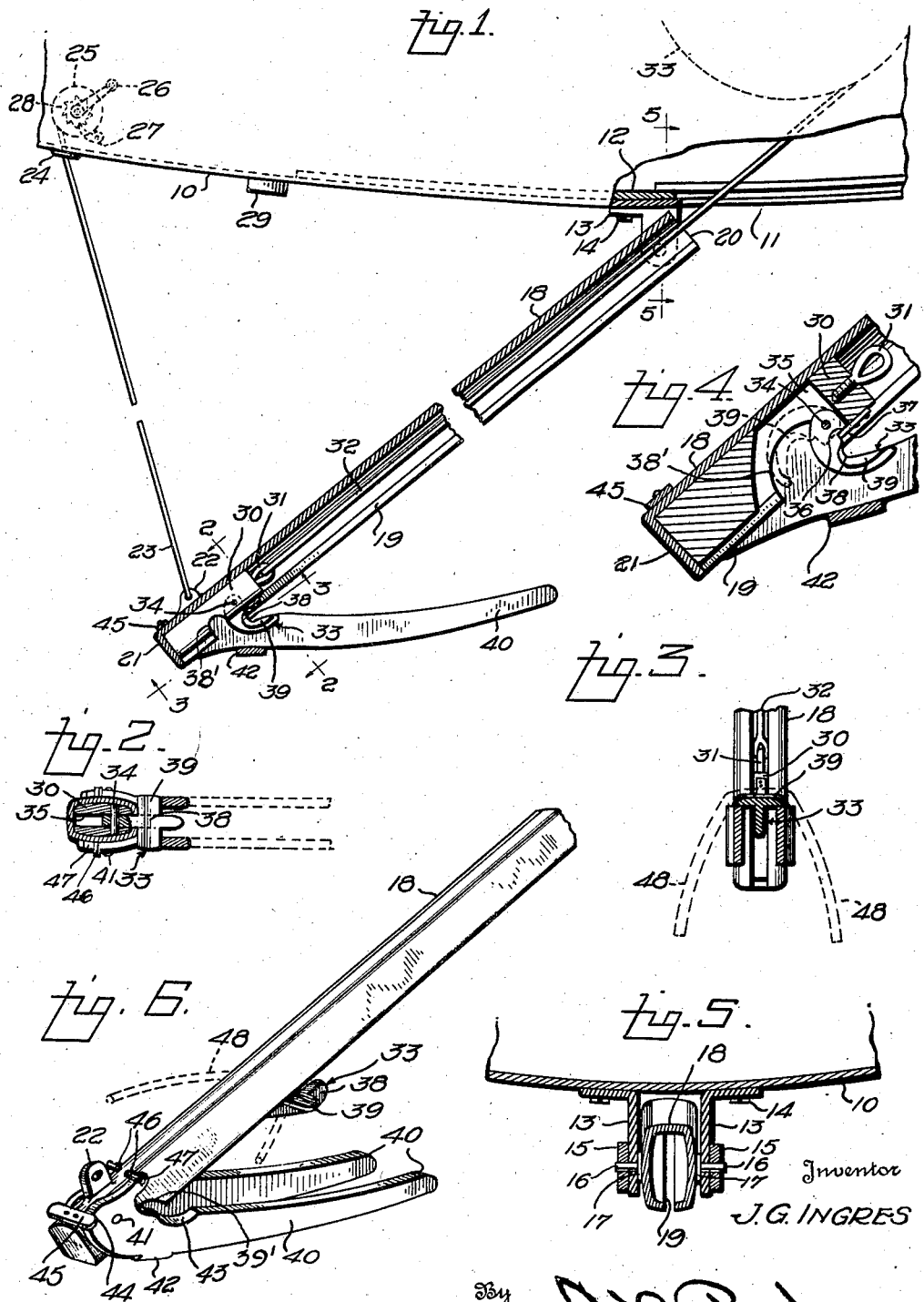

Patented Feb. 8, 1944

2,341,324

UNITED STATES PATENT OFFICE 2,341,324

AIRPLANE PICKUP MECHANISM

Jeannot G. Ingres, Detroit, Mich., assignor to E. Govan Hill and G. Tucker Smith, both of Richmond, Va., as trustees Application August 18, 1941, Serial No. 407,344

5 Claims. (Cl. 258—1.2)

This invention relates to airplane pick-up mechanisms, and more particularly to a mechanism for facilitating the picking up of mail bags and other packages from an airplane in flight at points where landing fields are not available, or wherein it is not desired to lose the time necessary for landing the plane to take on mail or the like.

In recent years several methods have been proposed for providing airplanes with depending hook mechanisms adapted to engage loops in shock cords connected to the packages or mail bags to be picked up, thus permitting the plane to engage the loop to permit the bag or package to be pulled up into the plane without the necessity for the plane having to land.

In one highly successful apparatus of this type, a rigid guide arm is carried by the fuselage of the plane and depends therefrom. A hook, connected to a cable extending into the plane, is mounted for sliding movement with respect to the guide. The hook is adapted to engage the loop of the shock cord connected to the article, whereupon the cable is wound upon a windlass in the plane to draw the hook and the shock cord connected thereto into the plane, the cable, hook and shock cord being wound about the windlass whereby the bag or article is hoisted completely into the fuselage of the plane.

Apparatus of the character referred to has been found highly successful in operation but is open to some disadvantages. In order that the hook carried by the pull-up cable be capable of being wound about the drum of the windlass, it is necessary that the hook be made relatively small. This is disadvantageous in itself, for the reason that the striking of the loop of the shock cord against the guide now and then will result in the rebounding of the shock cord away from the guide so that it misses being caught by the relatively small hook. Therefore it will be apparent that from the standpoint of providing certainty in the picking up of the shock cord it is desirable to provide a relatively large long hook, while from the standpoint of the winding of the cable and hook about the windlass drum to permit the pulling of the bag or article into the plane, it is desirable that the hook be made as small as possible.

An important object of the present invention is to provide a novel pick-up mechanism wherein the use of a relatively small hook is rendered practicable by providing means associated therewith for insuring the entrance of the loop of the shock cord into the pick-up hook.

A further object is to provide a novel device of this character wherein a stationary hook device is located at the lower end of the hook guide to engage the loop of the shock cord and positively guide it into the pick-up hook, thus rendering it practicable to employ a very small hook and rendering it more practicable to wind the pull-up cable with the hook thereon about the drum of the windlass.

A further object is to provide a guide hook device for insuring the entrance of the loop of the shock cord into the pick up hook, and to so mount the guide hook as to permit it to swing rearwardly out of operative position if more than a predetermined amount of force is applied thereto, for example, if the plane makes a forced landing, thus permitting the guide hook to assume an in operative position.

A further object is to provide a pick-up hook having its upper or loop engaging surface flush with the adjacent surfaces of the guide hook device when the parts are in the positions ready to pick up the loop of a shock cord, thus insuring the sliding of the loop over and into the pick-up hook.

A further object is to provide a mounting for the pick-up hook similar to that of the guide hook device to permit it to swing to an inoperative position, if excess force is applied thereto, thus avoiding the transmission of an undue drag to the plane in the event of a forced landing or any other occurrence which might tend to unduly load the hook.

Other objects and advantages of the invention will become apparent during the course of the following description.

In the drawing I have shown one embodiment of the invention. In this showing—

Figure 1 is a side elevation of a portion of an airplane fuselage showing the invention applied, parts being shown in elevation and parts being shown in section, with a portion of the fuselage broken away, Figure 2 is an enlarged detail sectional view on the line 2—2 of Figure 1, Figure 3 is a similar view on line 3—3 of Figure 1, Figure 4 is an enlarged fragmentary sectional view of the lower end of the guide arm and associated elements taken centrally of the width of the guide arm and looking in the same direction as Figure 1, Figure 5 is an enlarged fragmentary sectional view on line 5—5 of Figure 1, and, Figure 6 is a fragmentary perspective view of the lower end of the guide arm and associated elements, the pick-up hook being shown moved upwardly from its normal position for the purpose of illustration.

Referring to Figure 1 the numeral 10 designates the fuselage of an airplane, the bottom of which is provided with an opening 11 adapted to be closed by a slidable trap door 12. This opening is provided in order that the pick-up elements and the article or package carried thereby may be pulled completely into the fuselage as will become apparent.

The fuselage is provided rearwardly of the opening 11, that is, to the left of the opening 11 as viewed in Figure 1, with a pair of brackets 13 (Figures 1 and 5) bolted or otherwise secured to the fuselage as at 14. These brackets include depending arms to which are respectively secured bearing elements 15 receiving trunnions 16 having base portions 17 welded or otherwise secured to opposite sides of a guide arm 18.

The guide arm 18 is of the cross-sectional shape shown in Figures 2 and 5, being in the form of a flattened tube, inclined downwardly and rearwardly when in the operative position shown in Figure 1 and provided in its under side with a longitudinal slot 19 extending from end to end of the guide arm. The upper end of the guide arm is completely open as indicated by the numeral 20 in Figure 1 while an overhanging lip 21 or the like is provided at the lower end of the guide arm for a purpose to be described. The guide arm obviously is adapted to swing on the common axis of the trunnions 16 and is provided near its free end with an eye 22 to which one end of a cable 23 is connected, the other end of this cable extending through a grommet in the bottom of the fuselage 10 for connection with and passage around a small windlass drum 25. This drum is adapted to be manually operated by a crank handle 26 and a ratchet tooth 27 is engageable with a ratchet wheel 28 on the drum 25.

It will be apparent that the crank handle 26 may be operated to wind up the cable 23 and pull the free end of the guide arm 18 upwardly to a position adjacent the fuselage when the device is not in operation and a rubber or similar bumper 29 is secured against the bottom of the fuselage to resiliently engage a portion of the arm 18 when the latter is in the inoperative position. The ratchet 27 is manually releasable to permit the cable 23 to unwind and drop the arm 18 by gravity to the operative position shown in Figure 1, this approximate position being assumed when the airplane is in flight as will be apparent.

A slide 30 is movable longitudinally in the guide arm 18 and is provided at its upper end with an eye 31 to which is connected the lower end of a cable 32. The upper end of this cable extends through the open upper end 20 of the guide arm and through the opening 11 to be connected to and wound around a windlass drum 33. The use of such a drum, in itself, forms no part per se of the present invention, having been utilized in certain of the prior constructions referred to. Therefore, this drum need not be shown in detail and it will be understood that the upper end of the cable 32 is attached to the drum and that the drum may be rotated in any suitable manner to pull the cable 32 and the slide 30 upwardly into the fuselage of the plane.

The slide 30 carries a hook 33 pivoted thereto as as 34 within a recess 35 extending through the slide. The recess 35 is in the form of a straight sided slot as shown in Figure 2 and the shape of the slot longitudinally of the slide 30 is shown in Figure 4. The hook is provided with a shoulder 36 (Figure 4) engaged by the end of a stiff spring 37 to tend to hold it in the operative position shown in Figure 4. Adjacent the slot 19 in the arm 18, the hook 33 is provided with a flexible element receiving depressed portion 38 and adjacent such portion the hook is provided with integral oppositely projecting wing portions 39 for a purpose to be described. The depressed portion 38 extends across the winged portion of the hook as will be apparent in Figure 4. The slide 30 is notched as at 38' (Figure 4) and the sides of the arm 18 are similarly notched as at 39' (Figures 4 and 6) to permit the wing portions 39 to swing to the dotted line position in Figure 4.

A pair of guide hooks 40 are arranged on opposite sides of the arm 18 adjacent the lower end thereof and are pivoted thereto as at 41. These guide hooks are connected to each other by a preferably integral connecting web 42 so as to minimize the spreading thereof. The sides of the tube 18 are slightly curved in cross-section as shown in Figures 2 and 5 and the portions of the hooks 40 which overlie the sides of the arm 18 are curved to correspond to the cross-sectional shape thereof as shown in Figure 2, these curved portions being fitted against the sides of the arm 18 when the hooks 40 are in the operative position shown in Figures 1 and 6.

Each hook 40 is provided adjacent the guide 18 with a recess 43 in which the wing portions 39 of the hook 33 rest. It will be obvious in Figure 4 that the upper surface of the wing portion of the hook 33, when the latter is in operative position, is flush with the adjacent top surfaces of the hook members 40 whereby a loop in a flexible element sliding downwardly to the left along the hook 40 will readily slide across the wing portions 39 to rest in the depression 38.

Adjacent the pivot 41, each guide hook 40 is notched as at 44 to receive the adjacent overhanging end of a heavy leaf spring 45 secured to the top portion of the guide arm 18. The spring 45 has a strong tension resisting turning movement of the guide hooks 40 in a clockwise direction as viewed in Figure 6. Upon an overloading of the ends of the hooks 40, however, the leverage afforded by the hooks 40 will deform the spring 45 to permit the hooks 40 to swing about the pivots 41 whereby the hooks 40 will trail beyond the end of and substantially in alignment with the guide arm 18. The spring 45 tends to rotate the hooks 40 in a counter-clockwise direction as viewed in Figure 6, and stop pins 46, carried by the arm 18 engage projections 47 carried by the hook members 40, to limit turning movement of the hooks 40 to properly position them.

It will be apparent that the present apparatus is intended for use in conjunction with a suitable ground apparatus wherein a flexible element such as a shock cord is connected to the bag or article to be picked up and wherein a portion of the shock cord is supported across the ends of a pair of spaced masts to be engaged by the hooks 40 and 33. To illustrate the manner in which a pick-up hook 33 carries the loop of the shock cord, such loop has been shown in dotted lines in Figures 3 and 6 and has been designated by the numeral 48.

The operation of the mechanism is as follows:

As previously stated, a loop in a shock cord connected to the article or bag to be picked up is supported by the upper ends of spaced masts so as to extend between the masts in a position to be engaged by the hooks 40 carried by an airplane flying thereover. The ground mechanism may be of the type wherein the dead weight of a limited load is picked up by the airplane, or it may be, and preferably is, of the type wherein the pulling of the shock cord loop by the hooks 40 releases a catapult mechanism which projects the load to be picked up in the direction of movement of the airplane so as to prevent the placing of shock loads on the plane. Obviously the particular ground mechanism forms no part of the present invention.

Assuming that an airplane equipped with the present invention is approaching a pick-up station with the arm 18 pulled up against the cushion block 29, an operator within the plane will release the pawl 27 to permit the arm 18 to swing downwardly by gravity, the cable 23 freely unwinding from the drum 25. The force of gravity tending to swing the arm 18 to a vertical position will be counteracted by the wind resistance acting against the arm 18 and the elements carried thereby to hold it approximately at the rearwardly and downwardly extending angle shown in Figure 1.

The elements will now assume the positions shown in Figure 1 and as the plane approaches the pick-up station or ground mechanism, the pilot will lower the plane to a position wherein the hooks 40 are below the level of the suspended loop of the shock cord. When the pick up station is reached, the suspended loop cord will pass over the top of the hooks 40 and will strike against the lower or slotted side of the arm 18. Since the shock cord loop is stationary and the arm 18 is moving at a substantial speed, for example, 100 miles per hour, the striking of the arm 18 against the loop causes the latter to rebound momentarily away from the arm 18. With prior constructions a relatively small pick-up hook has been employed with the result that it sometime happened that the rebound of the shock cord loop would be such as to cause the hook to miss the loop, it being apparent that the angularity of the arm 18 is such as to cause the rebound to take place downwardly at a substantial angle whereby the loop could pass completely beneath the pick-up hook. With the present construction, the length of the guide hooks 40 is such that the shock cord loop cannot rebound sufficiently to miss the hooks 40, and accordingly these elements will engage the loop and guide it rearwardly for passage over the winged portion 39 of the hook 33 and thence into the loop receiving recess 38.

Accordingly the shock cord loop is caused to be positively guided into position to be picked up by the hook 33 and it is unnecessary for this hook to be of substantial size. After the pick-up loop has been engaged in the recess 38 the operator will cause the rotation of the windlass drum 33 to wind up the cable 32, the slide 30 moving longitudinally upwardly and forwardly of the arm 18. In Figure 6 of the drawing the hook 33 is shown in a position moved upwardly away from the hooks 40 which, of course, are stationary. The upper end of the arm 18 is open, and accordingly the continued winding of the cable 32 will result in the movement of the slide 30 from the open end 20 of the arm 18, and the slide 30 and hook 33 will pass upwardly into the body of the plane to be wound around the windlass together with the shock cord to which the picked-up article is connected. The article itself thus may be readily hoisted through the door 11 into the fuselage and thereupon detached from the shock cord and stored in a suitable place in the fuselage.

The operator of the mechanism will then slide the door 12 to closed position and will operate the crank 26 to swing the arm 18 upwardly into engagement with the cushion block 29. The parts will then remain inoperative until the next pick-up station is approached, whereupon the operator will open the door 12 and release the pawl 27 to permit the arm 18 to swing downwardly to the operative position shown in Figure 1. In the meantime the operator will have reversed the operation of the windlass 33 to unwind the shock cord therefrom and this cord is disengaged from the hook 33, whereupon the slide 30 is inserted in the open end 20 of the arm 18 and the reverse rotation of the windlass again started to lower the slide 30. Downward movement of this slide is limited by engagement of the bottom thereof with the lip 21 (Figure 1). All of the parts are now ready for operation to pick up the next bag or article.

From the foregoing it will be apparent that the hook 33 need be only large enough to properly carry the pick-up loop and need not be large enough to insure the initial picking up of the loop, this function being performed by the stationary hook 40. Therefore the hook 33 may be much more readily wound about the windlass 33 than is true of previous larger hooks, and at the same time the use of the hooks 40 provides far greater assurance that the pick-up operation will be properly performed without the rebounding of the pick-up loop away from the guide tube 18. Accordingly the present apparatus provides all of the functions of prior mechanisms employing a rigid pick-up arm; eliminates the difficulties and uncertainties of operation encountered with prior devices, and provides a certainty of operation eliminating the necessity for an aviator's turning for successive pick-up attempts after one or more previous attempts has failed. The arms 40 are rather rigidly held in position by the leaf spring 45. However, in the event of a forced landing of such nature that the hooks 40 will engage the ground, the force exerted on these hooks will cause the ends of the spring 45 to give away and thus permit the hooks 40 to swing in a clockwise direction as viewed in Figure 6, to assume positions projecting beyond the free end of the arm 18 substantially in alignment therewith. The hook 33 is also prevented under any conditions from so positively engaging the ground or the like as to provide a positive drag on the plane, the spring 37 being sufficiently strong to hold the hook 33 in operative position against the normal loads to which the hook may be subjected, but permitting the hook 33 to swing into the slot 35 if substantial force is applied to the free end of the hook 33.

It is to be understood that the form of the invention herewith shown and described is to be taken as a preferred example of the same and that various changes in the shape, size and arrangement of parts may be resorted to as do not depart from the spirit of the invention or the scope of the subjoined claims.

I claim:

1. An airplane pick-up mechanism comprising a guide arm connectible at its upper end with an airplane, a pick-up hook slidably supported by said guide arm for movement toward the airplane and normally arranged at the lower end of said arm for engagement with a flexible element carried by an article to be picked up, and hook means carried by the lower end of said guide arm and forming substantially a continuation of said hook when the latter is in normal position to guide the flexible element into engagement with said hook.

2. A pick-up device for an airplane having an opening in the bottom of the fuselage thereof, comprising a guide arm connected to the airplane adjacent said opening and depending therefrom, a pick-up hook slidably supported by said guide arm and normally arranged at the lower end thereof, said hook being engageable with a flexible element connected to an article to be picked up, flexible means connected at its lower end to said pick-up hook and extending upwardly through said opening whereby the hook may be pulled upwardly into the airplane fuselage, and hook means connected to the lower end of said guide arm and forming a continuation of said hook when the latter is in normal position to guide the flexible element into engagement with said hook.

3. An airplane pick-up mechanism comprising a guide arm connectible at its upper end with an airplane, a pick-up hook slidably supported by said guide arm for movement toward the airplane and normally arranged at the lower end of said arm for engagement with a flexible element carried by an article to be picked up, said hook having projections on opposite sides thereof flush with the top thereof in the portion of the hook engageable with the flexible element, and a pair of guide hooks carried by said arm parallel to each other on opposite sides of said pick-up hook and extending substantially therebeyond to guide the flexible element into engagement with said pick-up hook, said guide hooks having recesses in the upper edges thereof to receive said projections whereby the upper surface of said projections is flush with the adjacent upper edges of said guide hooks.

4. An airplane pick-up mechanism comprising a hook adapted to assume a normal position suspended beneath an airplane and engageable with a flexible element carried by an article to be picked up, means carried by the airplane for guiding said hook for movement upwardly toward the airplane, elongated stationary hook means normally stationary with respect to said guiding means and extending from said hook and engageable with the flexible element for guiding it into engagement with said hook when the latter is in normal position, and means carried by said guiding means for releasing said stationary hook means for swinging movement upon the application of greater than a predetermined force thereto.

5. An airplane pick-up mechanism comprising a guide arm connectible at its upper end with an airplane, a pick-up hook slidably supported by said guide arm for movement toward the airplane and normally arranged at the lower end of said arm for engagement with a flexible element carried by an article to be picked up, a hook pivotally connected to the lower end of said guide arm and arranged in a normal position to engage the flexible element and guide it into engagement with said pick-up hook, and holding means carried by said arm and normally holding said second named hook in normal position and releasable to permit its swinging to an inoperative position upon the application thereto of a force greater than a predetermined force.

JEANNOT G. INGRES.